Feb. 14, 1950 — S. S. WATKINS — 2,497,644
CIRCUMFERENTIALLY TRAVELING TYPE TIRE CHANGING APPARATUS
Filed July 19, 1945 — 5 Sheets-Sheet 1
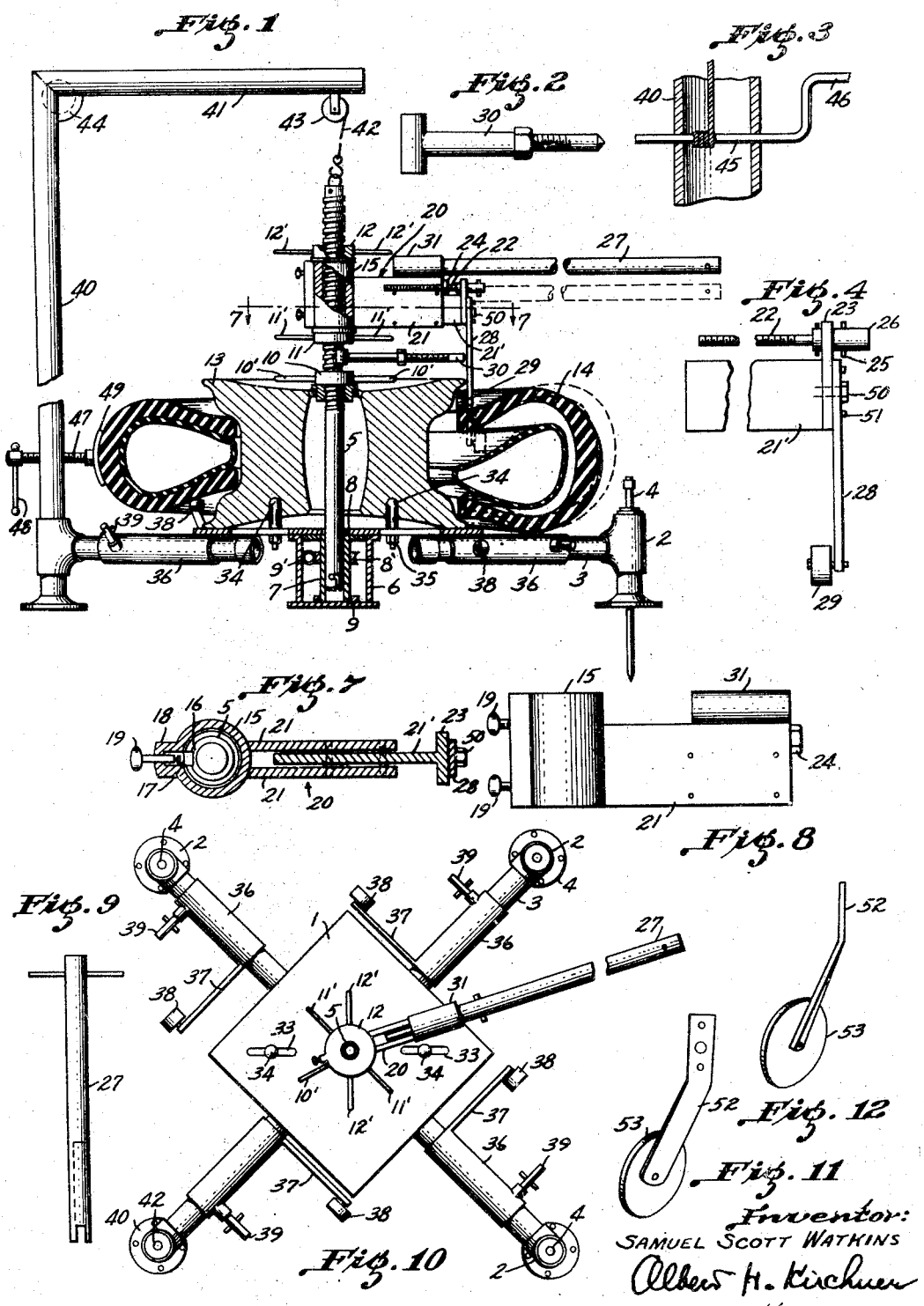
Inventor:
SAMUEL SCOTT WATKINS
BY Albert H. Kirchner
Attorney

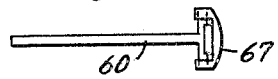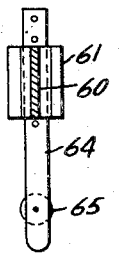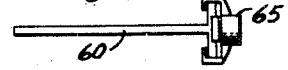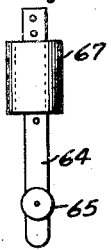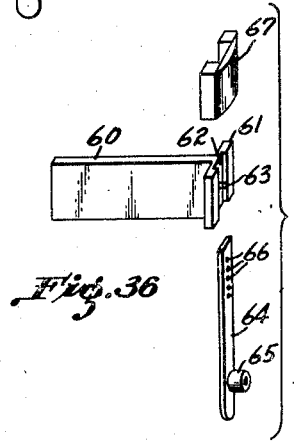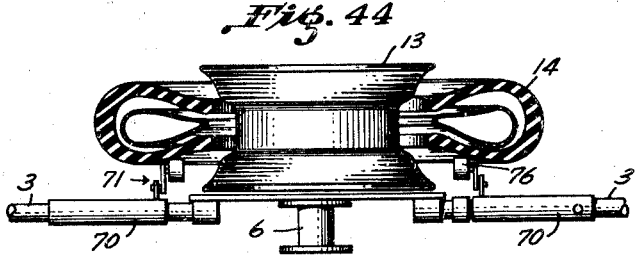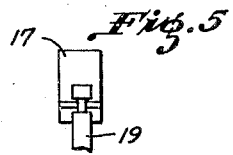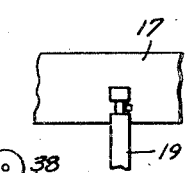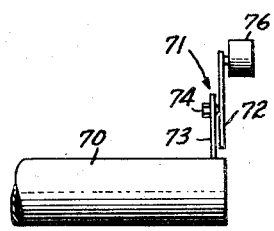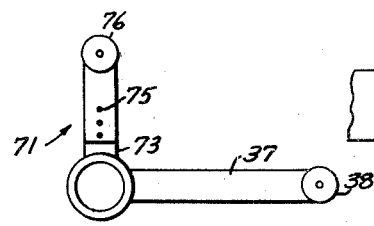

Inventor:
SAMUEL SCOTT WATKINS
By Albert H. Kirchner
Attorney

Feb. 14, 1950 — S. S. WATKINS — 2,497,644
CIRCUMFERENTIALLY TRAVELING TYPE TIRE CHANGING APPARATUS
Filed July 19, 1945 — 5 Sheets-Sheet 4

Inventor:
SAMUEL SCOTT WATKINS
Albert H. Kirchner
BY Attorney

Inventor:
SAMUEL SCOTT WATKINS
BY Albert H. Kirchner
Attorney

Patented Feb. 14, 1950

2,497,644

UNITED STATES PATENT OFFICE 2,497,644

CIRCUMFERENTIALLY TRAVELING TYPE TIRE-CHANGING APPARATUS

Samuel Scott Watkins, Miami, Fla.

Application July 19, 1945, Serial No. 605,929

6 Claims. (Cl. 157—1.24)

This invention relates to an improved apparatus for changing pneumatic tires, i. e., for mounting pneumatic tire casings on their wheels and stripping them from their wheels. It has particular reference to the handling of heavy, large size casings of the type used on the wheels of aircraft, but is not limited to such use.

Heretofore considerable difficulty has been experienced in the handling of large size tire casings, both in mounting and in removing them. These casings are heavy and unwieldy. After being mounted on a wheel for even a short time the beads of such a tire tend to adhere to the rim flanges of the wheel and to resist separation therefrom, and even when the rim is of the drop center or other improved type it is difficult to manipulate the beads, which of course are not capable of being stretched, so as to pass the rim flanges in the operation of separating the casing from the wheel or of mounting it on the wheel.

Many of the large size tire casings which are now commonly used on heavy motor vehicles and particularly on aircraft can not be handled for mounting or dismounting by hand, aided only by the use of ordinary tire irons and hammers.

Numerous mechanical devices have been proposed to apply force at the required mechanical advantage to such casings to assist in passing the beads thereof over the wheel flanges, but all of such prior art devices with which I am acquainted are subject to certain serious objections and disadvantages. Many of them are elaborate and expensive to make and hard to operate; use of some of them is apt to result in injury to the tire; many of them require the labor of two or more men; and none of them is entirely foolproof and dependable in operation.

The principal objects of the present invention are to provide a device of the character indicated which can be inexpensively and readily made, which is easily operated by one man possessing no special skill and having no particular experience, and which will quickly and unfailingly apply a tire to or remove it from a wheel of the drop center or other usual type, regardless of size, weight or other considerations.

A preferred embodiment of the invention which has been thoroughly tested in actual practice and found to give satisfactory and reliable service is illustrated on the accompanying drawings and will be described in detail hereinafter.

The invention is capable of being embodied in other and variously modified forms of construction, all within the principles which will be pointed out in the appended claims.

In the accompanying drawings,

Figure 1 is a vertical central section through a preferred embodiment of the invention showing a wheel and a tire casing mounted in position for assembly or separation;

Fig. 2 is a side elevational view of a type of jack member used with the device;

Fig. 3 is a fragmentary vertical central sectional view taken through the standard or upright which may form part of the device, showing the hoist for elevating and lowering the main shaft;

Fig. 4 is a side elevational view of the adjustable roller mount;

Figs. 5 and 6 are detail views of the key by which the device is converted from manual to power operation;

Fig. 7 is a horizontal cross-sectional view taken along the line 7—7 of Fig. 1;

Fig. 8 is a side elevational view of the bushing and fixed part of the extensible arm by which the roller mount of Fig. 4 is adjustably positioned on the main shaft;

Fig. 9 is a side elevational view of a handle for adjusting various parts of the apparatus;

Fig. 10 is a top plan view of the device with the hoisting upright or standard shown in cross section;

Figs. 11 and 12 are perspective views of a bead-loosening roller arm;

Fig. 35 is a perspective view of an attachment for use with the machine;

Fig. 36 is an exploded perspective view of an alternative type of adjustable roller mount;

Fig. 37 is a sectional view taken on the line 37—37 of Fig. 39;

Fig. 38 is a top plan view of the same parts with the roller arm omitted;

Fig. 39 is a side elevational view of the complete assembly;

Fig. 40 is a top plan view of the complete assembly;

Fig. 41 is a front elevational view thereof;

Fig. 42 is a side elevational view of a modified form of bushing for the legs of the machine;

Fig. 43 is an end elevational view of the modified bushing;

Fig. 44 is a diagrammatic sectional view showing use of the modified bushing.

Figure 13:
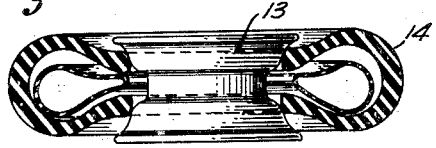
Figs. 13-16 are diagrammatic views illustrating the sequence of operations by which a tire bead is loosened from the wheel.

Referring to these drawings, a preferred form of construction includes a bed in the form of flat plate 1 mounted horizontally on a plurality of short vertical feet 2, here shown as four in number, each of which is connected by a horizontal leg 3 to the under surface of the plate 1. The legs may be formed of pipe sections, as shown, which are securely welded to the plate 1 so as to radiate at equally spaced intervals therefrom, and the feet may be made of similar but shorter pipe sections, connected to the legs by L's or T's and conveniently flanged and perforated at their bottoms for bolting to a floor. In order to mount the device in a stable position outdoors on the ground, each of the feet may be provided with a top perforation through which a stake 4 may be driven into the ground.

The center of the plate 1 is perforated to receive a vertical main shaft 5, shown in the illustrated embodiment as tubular but which might be formed from solid rod stock, which is rotatably supported in a thrust bearing assembly including a housing 6 which is secured to the bottom of the plate and has an under surface in the same plane as the bottoms of the feet 2 so that this housing serves as a central foot for the structure. The bearing assembly is best arranged to make the shaft 5 removable, as by use of the construction shown in Fig. 1 where the shaft 5 is set into a short tubular shaft 7 by means of a bayonet slot and pin connection. The shaft 7 is rotatably mounted in upper and lower bearings 8 and 9 in the housing. For power driving, as will be hereinafter described, the short tubular shaft 7 may have fixed around it a worm wheel 8' engaged by a worm 9' which extends radially from the housing to receive a drive from any convenient power source. The friction inherent in the worm gearing is sufficient to fix the shaft 5 against rotation under any torque applied to any of the tire handling parts carried by its upper portion, hereinafter to be described, while rotation of the short tubular shaft 7 will rotate the shaft 5. The shaft 5 is readily removed from the shaft 7 by a fractional reverse turn followed by axial lifting.

The upper portion of the main shaft 5 is screw-threaded and provided with a lower nut member 10, an intermediate nut member 11 and an upper nut member 12, each having a pair of short radiating arms 10', 11' and 12', respectively, which serve as handles by which the corresponding nut member may be rotated so as to be moved up or down along the shaft. The lower nut member 10 is used to turn down onto a vehicle wheel 13 which is mounted on the bed with the shaft 5 upstanding through its hub and onto which, or from which, a pneumatic tire casing 14 is to be mounted or removed. As shown in Fig. 1 the nut 10 is engaged with an anti-friction bearing assembly of the type commonly used with some wheels, but it will be evident that the engagement might be directly with the wheel or with an interposed washer.

Between the intermediate and upper nut members 11 and 12 a sleeve or bushing 15 having a smooth, non-threaded bore is interposed. It will be evident that adjustment of the nut members 11 and 12 will serve to position the bushing 15 at any selected height on the shaft 5. A keyway 16 (Fig. 7) is formed in the shaft 5, and a key 17 is movable in and out of this keyway from a pocket 18 through which thumb screws 19, rotatably mounted in the key as shown in Figs. 5 and 6, extend from the bushing 15, so that the bushing can be locked against rotation on the shaft, or can be freed for rotation on it.

Extending radially from the bushing 15, conveniently diametrically opposite from the pocket 18, is a telescopically extensible arm 20 comprising three parallel plates, the two outer of which, designated 21, are welded to the bushing and spaced apart to form a guideway for the single interposed plate, designated 21'. The length of the arm 20 is determined by the setting of a screw 22 which is journaled in a head 23 upstanding from the outer end of the interposed plate 21', which screw is threaded in a crossbar 24 welded across the outer edges of the two outer plates 21, above the interposed plate. Radial pins 25 may be provided on the protruding head 26 of the screw 22 to be engaged by a handle 27 (Fig. 9) or any other type of head and wrench may be provided for rotating the screw to adjust the length of the arm 20.

The head 23 of the interposed plate 21' supports a detachable depending arm 28 on the lower end of which is mounted a roller 29, and a jack 30 (Fig. 2) in the form of a telescopically arranged screw and sleeve having end fittings for engaging respectively the shaft 5 and the arm 28 may be interposed between the shaft and arm for exerting radially outward thrust on the arm for a purpose hereinafter to be explained.

Welded across the upper edges of the fixed outer plates 21 is a tubular socket 31 adapted to receive the handle 27 by which the bushing 15 and the arm 20 may be manually rotated on the shaft 5 when the key 17 is withdrawn from the keyway 16 into the pocket 18.

The bed plate 1 is provided with two or more radial slots 33 in each of which is mounted a short post 34 by the interfit of a narrow shank, capped by a bottom nut 35, so that the posts 34 can be adjusted at selected radial distances from the shaft 5 to fit into such openings as are usually formed in the wheel 13 to decrease the amount of metal and lighten the wheel. Thus the wheel is held against rotation on the plate 1.

Sleeved over each of the legs 3 is an elongated bushing 36 which is slidable and rotatable on the leg and has at its inner end a radiating arm 37 provided with a roller 38 and has at its outer end a set screw 39 having radiating pins or other special configuration adapted to be engaged by the handle 27 so that this handle may be used to rotate the sleeves about the legs to swing the rollers 38 up or down and may be used also to turn the set screws down into engagement with the legs to fix the rollers at any adjusted elevation.

Rising from one of the feet 2 is a standard 40 from the top of which a cross arm 41 extends to a point over the end of the shaft 5. A cable 42 is hooked to the upper end of the shaft and trained over pulleys 43, 44 mounted on the cross arm and post and has its end fastened to a winding drum or windlass 45 mounted in the post and having a projecting crank handle 46 by which the shaft and the parts carried by it can be elevated from or lowered into the plate 1 when the bayonet slot and pin connection in the housing 6 is disconnected.

A pressure screw 47 is threaded through the standard 40 and provided with an operating handle 48 and a broad curved shoe 49 at such elevation on the standard that the shoe will engage and exert pressure against a tire casing 14 of any size that may be used on the device.

The roller arm 28 is made readily detachable from the head 23 of the plate 21 by removal of a single bolt 50 which penetrates the central one of three openings in the arm 28 and is threaded into the head 23. The two endmost openings fit over pins 51 which extend from the head 23 to secure the arm 24 against swinging movement when the bolt 50 is turned down tight. The arrangement is such that the arm 28 may be mounted on the head 23 with either of its flat side faces engaged with the head, so that the roller 29 will project inwardly toward the shaft 5 as shown in full lines in Fig. 1, or outwardly therefrom, as shown in dotted lines.

Bent arms 52 carrying thin wheels 53 (Figs. 11 and 12) are provided for mounting on the head 23 in place of the straight arm 28, for a purpose which will be hereinafter described.

The device constructed and arranged as thus explained is used in the following way:

The operational steps by which a wheel and tire, mounted on the machine as shown in Fig. 1, are assembled and separated, are shown diagrammatically in Figs. 13–34.

Figure 14:
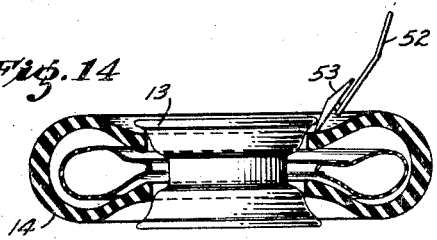
Figure 15:
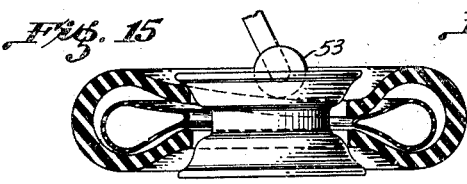
Figure 16:
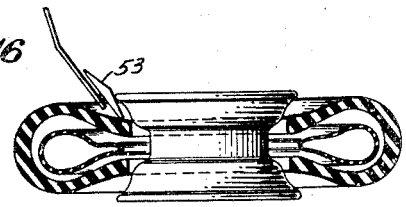

Figs. 13–16 illustrate the sequence of steps by which the machine is used to perform the preliminary operation which is sometimes necessary to loosen a tire casing which has become stuck tightly to the rim flanges of any wheel, such as the drop center type of wheel which has been selected to exemplify the use of the machine. The wheel and tire assembly are mounted on the bed plate 1 in the position shown in Fig. 1, with the rollers 38 all dropped down out of contact with the tire as shown at the right hand side of Fig. 1 and with the posts 34 engaged in openings in the wheel to hold the wheel against rotation on the bed plate. The main shaft 5 is then lowered through the hub of the wheel and locked in the axially fixed tubular shaft 7 by rotation of the two members of the bayonet connection. The lower nut member 10 is then turned down into enagement with the upper side of the wheel or with an interposed washer or the bearing assembly shown in Fig. 1, so that the wheel is held against upward movement. A roller 53 and its arm 52 are then mounted on the telescoping arm 20 and the latter arm is then lengthened or shortened by turning the screw 22 to bring the roller into position just over the upper bead of the tire, close to the wheel rim. The intermediate nut member 11 is next adjusted to lower the bushing 15 and the arm 20 so that the roller 53 engages the tire bead as shown in Fig. 14. Then with the intermediate nut member 11 turned down, out of the way on the shaft 5, the upper nut member 12 is turned down by means of the arms 12', to which the handle 27 may be applied to give increased leverage, to press the roller 53 down against the tire bead. This loosens a portion of the bead from the wheel rim, pushing a short segment of the bead down into the drop center of the wheel. Then by means of the handle 27 engaged in the socket 31, or by means of power applied to the worm 9', the bushing 15 and arm 20 are rotated relatively to the fixed wheel 13, either with or without rotation of the shaft 5, so that the pressure of the roller 53 becomes applied progressively all the way around the upper bead of the tire, and the entire bead thus becomes pushed down into the drop center of the wheel. Fig. 15 shows a portion of the bead pushed into the drop center, and Fig. 16 illustrates the whole upper bead so displaced.

If both beads are stuck and require loosening, the wheel may be turned over on the bed 1 and the operation repeated on the other bead. The result is shown in Fig. 16, where both beads are depressed into the drop center of the wheel.

Figure 17:
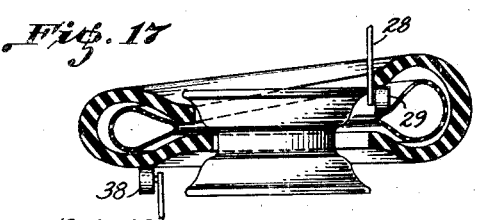
Figs. 17-19 are diagrammatic views illustrating the sequence of operations by which the bead at one side of a tire casing is separated from the wheel.
Figure 18:
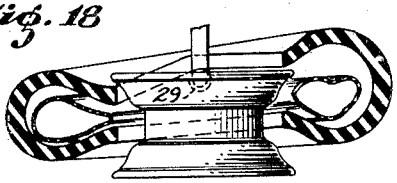
Figure 19:
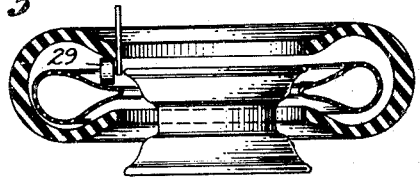

Figs. 17–19 show the operations by which the uppermost of the two loosened beads is lifted from the wheel. This operation is begun by replacing the roller 53 and its arm 52 by the roller 29 and arm 28, mounted with the roller on the outer side of its arm, as shown in dotted lines in Fig. 1. The roller is first inserted under a point on the upper bead, down in the drop center of the wheel, which is most easily accomplished by using the pressure member 47, diametrically opposite the arm 20, to push the adjacent part of the casing well into the drop center and, if desired or thought necessary, by turning up the adjacent lower roller 38 into position to support this portion of the casing in the drop center. This brings the diametrically opposite portion of the casing, adjacent to the location of the roller 29, sufficiently far out beyond the wheel and its rim to admit the roller 29, all as shown in Figs. 1 and 17. The intermediate nut member 11 is then turned up on the shaft 5 to elevate the arm 20 and roller 29 and pull the adjacent short segment of the tire bead up beyond the wheel rim. Rotation of the arm 20, either manually on the stationary shaft 5 or with the shaft driven by power applied to the worm 9, results in pulling the whole extent of the upper bead up beyond the wheel rim, through the stages shown in Figs. 17 and 18, finally resulting in the condition shown in Fig. 19. In this rotating operation the jack 30 may be expanded against the arm 28, as shown in Fig. 1, to relieve friction of the arm 28 on the wheel flange and transfer this friction to the engaged areas of the shaft 5 and the jack 30, where it may be reduced by lubrication.

Figure 20:
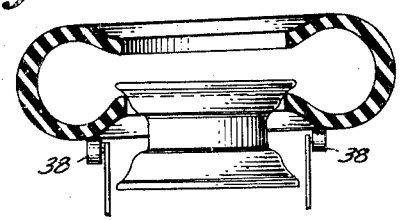
Figs. 20-23 are diagrammatic views illustrating the sequence of operations by which the bead at the opposite side of the tire is removed from the wheel.

The inner tube is then easily removed and all four of the lower rollers 38 are turned up to the position shown in Fig. 20, so as to support the casing with its lower bead held in contact with the upper rim of the wheel. This adjustment of the rollers 38 is easily made by fitting the handle 27 successively over each of the set screws 39, then swinging the handle up to rotate the bushing 36 until the roller 38 is in the desired raised position, and then rotating the handle about its axis to turn the set screw down into contact with the leg 3 to hold the roller in position.

Figure 21:
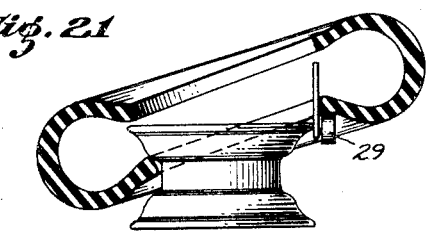
Figure 22:
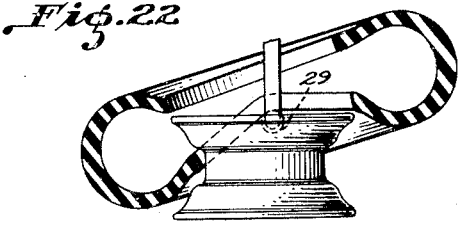
Figure 23:
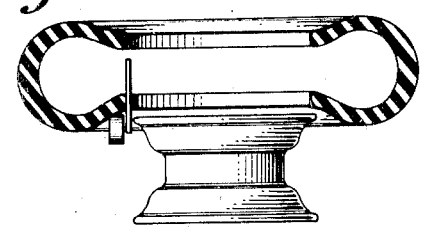

The separation of the lower bead from the wheel is shown in Figs. 21–23, and is begun by inserting the roller 29 over the lower bead, between it and the upper rim flange of the wheel, as in Fig. 21. The arm 20 is then raised by the nut member 11 and turned around the wheel through the portion shown in Fig. 22 until the whole of the lower bead passes the upper rim flange of the wheel, as shown in Fig. 23.

It is then a simple matter to remove the casing from the wheel and from the machine, by pulling the shaft 5 up out of the bed 1, or by first disconnecting the cable 42 from the shaft and slipping the tire casing up over the end of the shaft.

Figs. 24-34 show how a tire casing is applied to a wheel mounted on the machine in the position indicated in Fig. 1.

Figure 24:
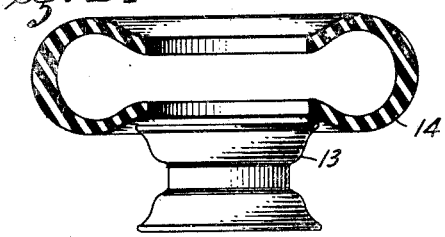
Figs. 24-28 are diagrammatic views illustrating the sequence of operations by which the bead at one side of a tire is mounted on the wheel.

The casing is first laid on top of the wheel, in the manner shown in Fig. 24, and is then pushed a little to one side so that a short segment of the lower bead will lie out beyond the upper flange of the wheel. The arm 28 is mounted on the head 23 of the arm 20 with the roller 29 on the inner side of the arm 28, and suitable adjustments of the arm 20 and nut member 12 are then made to push the roller 29 down beneath the upper flange of the wheel and press the affected segment of the lower bead down into the drop center, as shown in Fig. 25.

Figure 25:
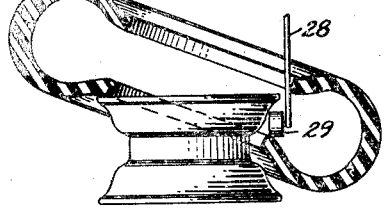
Figure 26:
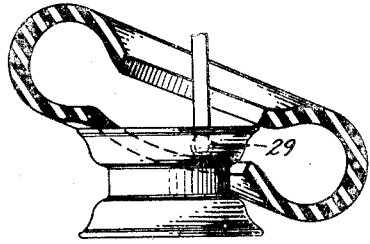
Figure 27:
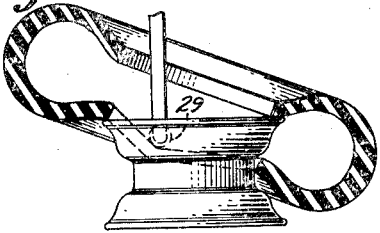
Figure 28:
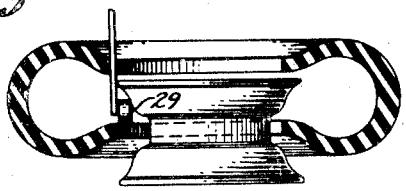

Then the arm 20 is rotated to turn the roller 29 around the bead and in contact with it, so that the whole bead becomes pushed down over the upper flange of the wheel, through the stages shown in Figs. 25-27, until the entire bead has been moved into the drop center of the wheel, with the upper bead resting on the upper side surface of the wheel, as shown in Fig. 28.

Figure 29:
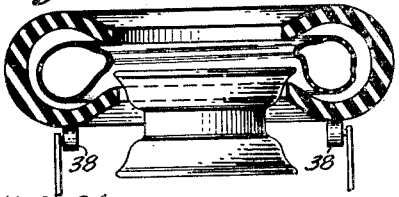
Figs. 29-34 are diagrammatic views illustrating the sequence of operations by which the bead at the opposite side of a tire is mounted on the wheel.
Figure 30:
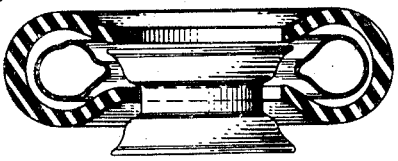

The lower rollers 38 may then be turned up to support the lower bead in the upper bead seat of the wheel, as shown in Fig. 29, whereupon the inner tube may be put into the casing.

Figure 31:
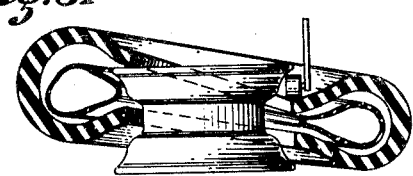
Figure 32:
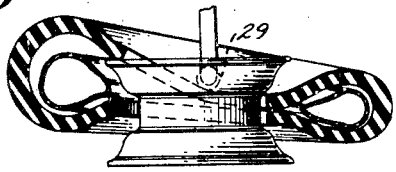
Figure 33:
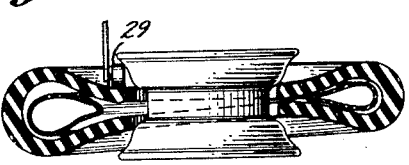

The upper bead of the casing is then pushed down into the drop center by the operations shown in Figs. 30-33. These steps include pressing the roller 29 down against a point on the upper bead to push the adjacent segment thereof down past the upper wheel flange, as shown in Fig. 31, and then turning the roller around the bead and in contact with it through the position shown in Fig. 32 until the whole upper bead has been pushed into the drop center, as shown in Fig. 33.

Figure 34:
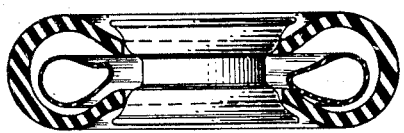
Figure 45:
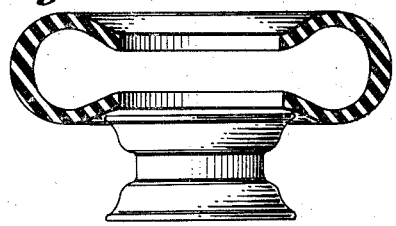
Figs. 45-55 are diagrammatic views, conforming generally to Figs. 24-34, by illustrating the sequence of operations using the roller mount of Figs. 36-41 to mount a tire on a wheel.
Figure 46:
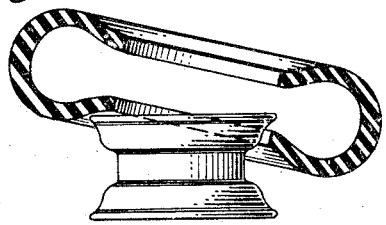
Figure 47:
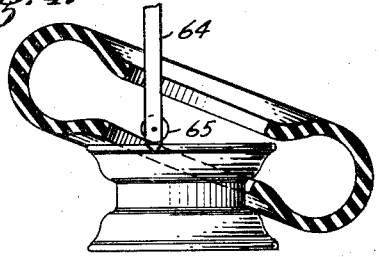

The tube may then be inflated to expand the two beads of the casing into their seats on the wheel as shown in Fig. 34.

Sheet 4 of the drawings illustrates certain modifications of some of the elements and certain accessories which are useful with the machine.

Fig. 35 shows at 59 a small conical element which can be set into the axle opening of a wheel in order to receive the thrust of the lower nut member 10. This conical element is useful in connection with wheels that do not have anti-friction bearings, one of which is illustrated in Fig. 1.

Figs. 36-41 show a modified type of roller mount which can be used in place of the construction shown in Fig. 4. The modified form includes a plate 60 which takes the place of the plate 21' in the extensible arm 20. This plate 60 has at its outer end a head 61, formed much like the head 23, but provided with a vertically extending central channel 62 open at both its ends and having a fixed pin 63 projecting forwardly from its middle. An arm 64 takes the place of the arm 28 and has a roller 65 journaled just above its lower end and is provided with a series of holes 66 along its upper portion. These holes selectively receive the pin 63 to determine the effective extent to which the roller 65 depends from plate 60 and hence from the sleeve or bushing 15 to which it is secured.

A cap 67 may be dropped over the head 61 after the arm 64 is mounted on the head. This cap is channeled at its rear to fit the sides of the head, and is closed at its top so as to rest on the top of the side portions of the head and is open at its center to pass the arm 64. Thus the cap keeps the arm 64 from becoming accidentally separated from the head 61 and plate 60.

The use of the arm 64 with its lower portion projecting below the roller 65, in mounting a tire on a wheel, is shown diagrammatically in Figs. 45-55. It will be observed from these figures, which parallel Figs. 24-34, that the lower projecting end of the arm 64 facilitates accurate placing of the roller 65 properly on the tire bead. This is accomplished by inserting the projecting end portion of the arm down inside the bead, which automatically locates the roller in proper position.

Figure 48:
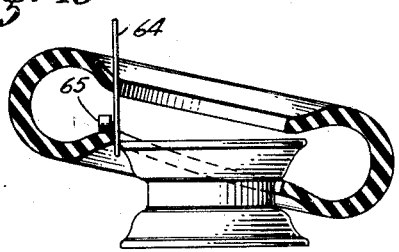
Figure 49:
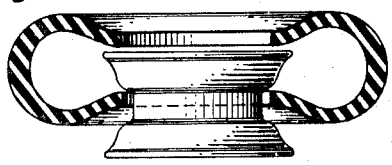
Figure 50:
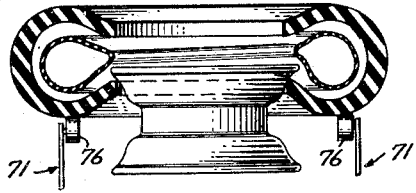
Figure 51:
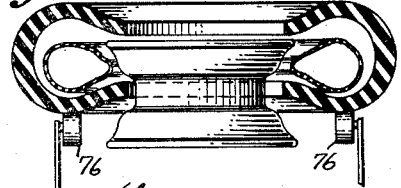
Figure 52:
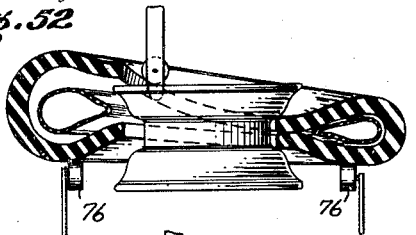
Figure 53:
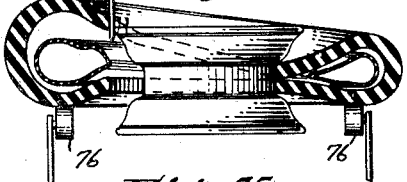
Figure 54:
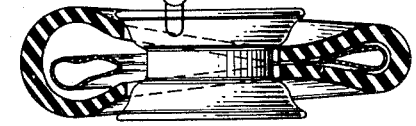
Figure 55:
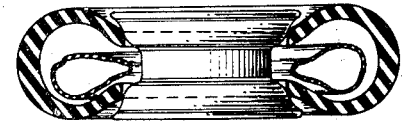

A further advantage of the roller 65, mounted as shown in Fig. 36, is that its position relative to the arm 64 does not have to be reversed between the operations of mounting and removing a tire. This will be appreciated by comparing Fig. 48 with Fig. 17. Fig. 48 shows the roller 65 projecting outwardly from its mount and being used to roll a bead down into the drop center, in the process of mounting the tire. Fig. 17 shows the roller 29 being used to pull a bead up from the drop center past the wheel flange in the operation of removing a tire from the wheel. Since both the rollers project outwardly from their mounting, it will be evident that the roller 65, mounted as shown in Fig. 39, can be used for installing and removing tires without reversing its direction.

Figs. 42 and 43 show at 70 a modified type of bushing 36. In this modification the bushing is provided with the arm 37 and roller 38, but it carries also a lengthwise adjustable arm 71, formed of arm elements 72, 73 connected by a pin 74 projecting from one of the elements and fitting selectively into holes 75 formed in the other element. The arm assembly carries a roller 76 which is like the roller 38. Its use may be explained as follows:

It frequently happens, particularly in the case of large tire casings, that when the assembly of casing, tube and wheel is completed, it is found that the casing has rotated somewhat on the wheel, so that the valve stem of the tube is misaligned. This requires a corresponding reverse rotation of the casing to restore alignment. The modified bushing construction which has just been explained greatly facilitates this rotation, when it is used as shown in Figs. 50-53. In such use, the arms 71 of the four bushings 70 are turned up and adjusted for length so that the four rollers 76 will receive the lower side wall of the tire and hold it in the drop center of the wheel, in the position shown in Fig. 51. Then, after the upper bead is forced down into the drop center, between the operations shown in Figs. 52-54, both beads are positioned in the drop center and it is a very simple matter to rotate the casing manually to achieve accurate alignment of the valve stem. Of course, subsequent inflation of the tube forces the beads outwardly against the wheel flanges and binds them securely in place.

I claim:

1. In a tire changing apparatus, means for pulling a tire casing bead from the rim of a wheel comprising a support for holding the wheel in fixed position, a shaft mounted on the support and having a threaded portion extending axially through the wheel, an element adapted to be inserted beneath a bead of the casing and to extend outwardly therefrom in an axial direction past the adjacent rim of the wheel, a bushing sleeved on the shaft supporting said element, a nut member threaded on the shaft beneath the bushing and adapted to be turned up on the shaft to slide the bushing along the shaft and cause the element to pull a segment of the casing bead past the rim, and means for revolving the bushing and said element about the axis of the shaft around the rim to pull progressively the entire bead past the rim.

2. In a tire changing apparatus, means for pulling a tire casing bead from the rim of a wheel comprising a support for holding the wheel in fixed position, a shaft mounted on the support and having a threaded portion extending axially through the wheel, an element adapted to be inserted beneath a bead of the casing and to extend outwardly therefrom past the adjacent rim of the wheel, a bushing supporting said element sleeved for axial movement on the shaft, means for selectively fixing the bushing against rotation on the shaft and for freeing it for rotation thereon, a nut member threaded on the shaft beneath the bushing and adapted to be turned up on the shaft to slide the bushing along the shaft and cause the element to pull a segment of the casing bead past the rim, and means for selectively rotating the bushing on the shaft and independently thereof operable when the bushing is freed for rotation thereon and for rotating the shaft and bushing together when the bushing is fixed against rotation on the shaft, whereby the element is revolved about the rim of the wheel to pull progressively the entire bead past the rim.

3. In a tire changing apparatus of the type in which a wheel is mounted in fixed position on a support and a tire manipulating element is revolved around the wheel in contact with a bead of the tire, the combination with said support of a shaft extending axially through the mounted wheel and mounting the element on its extended portion, means movable to lock the element against rotation on the shaft or to free it for rotation on the shaft, a handle for rotating the element on the shaft when the element is free on the shaft, and a connection for applying power to the shaft to rotate it and the element together when the element is locked on the shaft.

4. In apparatus for removing from a drop center wheel a tire which has its beads aligned with the drop center of the wheel, a support for holding the wheel in fixed horizontal position, a standard mounted at one side of the support, pressure means reacting between the standard and the tire for forcing the beads of the tire into the drop center at said side whereby a bead portion at the diametrically opposite side of the tire will be pushed radially beyond the adjacent edge of the wheel rim, and means at the last named side adapted to be inserted beneath the adjacent bead portion and operable to pull the same beyond the wheel rim.

5. In a tire changing apparatus for drop center wheels, a support for holding the wheel in fixed horizontal position, a standard mounted at one side of the support, means operated at said side for forcing the side walls of the tire axially of the wheel so as to bring the beads of said side walls into alignment with the drop center of the wheel, pressure means mounted at said side of the support reacting between the standard and the tire for forcing said beads into the drop center whereby a bead portion of the diametrically opposite side of the tire will be pushed radially beyond the adjacent edge of the wheel rim, and means at the last named side adapted to be inserted beneath the adjacent bead portion and operable to pull the same beyond the wheel rim.

6. Apparatus for removing a tire from a drop center wheel including a support for holding the wheel in axially fixed position comprising a horizontal bed, a plurality of horizontal legs mounted on the support and each having an arm swingable about it and adapted to be fixed in radially adjusted upstanding position for supporting in alignment with the drop center of the wheel the bead of one side wall of the tire, means mounted on the support and movable against the other side wall of the tire for forcing said wall in one direction axially of the wheel so as to free the bead of said side wall from the adjacent wheel rim and force said bead into alignment with the drop center of the wheel, and an element movable parallel to the axis of the wheel for insertion under said bead and for pulling the same axially of the wheel in the opposite direction to remove said bead from the wheel.

SAMUEL SCOTT WATKINS.

REFERENCES CITED

The following references are of record in the file of this patent:

UNITED STATES PATENTS

| Number | Name | Date |
| --- | --- | --- |
| 1,316,390 | Rischard | Sept. 16, 1919 |
| 1,341,727 | Weaver | June 1, 1920 |
| 1,394,400 | Berg | Oct. 18, 1921 |
| 1,402,471 | Beck | Jan. 3, 1922 |
| 1,451,344 | Robinett | Apr. 10, 1923 |
| 1,564,496 | Staugaard | Dec. 8, 1925 |
| 1,742,590 | Freivogel | Jan. 7, 1930 |
| 1,793,864 | Manley | Feb. 24, 1931 |
| 1,936,817 | Allen | Nov. 28, 1933 |
| 2,034,819 | Maulis | Mar. 24, 1936 |
| 2,401,118 | Talley et al. | May 28, 1946 |

FOREIGN PATENTS

| Number | Country | Date |
| --- | --- | --- |
| 121,296 | Great Britain | Dec. 5, 1919 |
| 395,406 | Germany | July 1, 1922 |
| 765,192 | France | Mar. 19, 1934 |